United States Patent [19]

Hirosawa et al.

[11] Patent Number: 5,243,667
[45] Date of Patent: Sep. 7, 1993

[54] SYSTEM AND METHOD OF IMAGE PROCESSING

[75] Inventors: Makoto Hirosawa; Hidetoshi Nakanishi, both of Kyoto, Japan

[73] Assignee: Dainippon Screen Mfg. Co., Ltd., Kyoto, Japan

[21] Appl. No.: 902,205

[22] Filed: Jun. 22, 1992

[30] Foreign Application Priority Data

Jun. 24, 1991 [JP] Japan .................. 3-180202

[51] Int. Cl.⁵ ............................... G06K 9/42
[52] U.S. Cl. .................. 382/47; 358/426; 382/41; 382/56
[58] Field of Search .......... 382/47, 56, 41, 44; 340/731; 358/426, 133

[56] References Cited

U.S. PATENT DOCUMENTS

| | | | |
|---|---|---|---|
| 4,809,350 | 2/1989 | Shimoni et al. | 382/56 |
| 4,827,432 | 5/1989 | Kasano | 382/41 |
| 5,101,443 | 3/1992 | Behrmann-Poitiers | 382/56 |
| 5,113,455 | 5/1992 | Scott | 382/47 |
| 5,125,043 | 6/1992 | Karlsson | 382/47 |
| 5,148,271 | 9/1992 | Kato et al. | 382/56 |
| 5,170,442 | 12/1992 | Murai et al. | 382/47 |

*Primary Examiner*—Joseph Mancuso
*Attorney, Agent, or Firm*—Lowe, Price, LeBlanc & Becker

[57] ABSTRACT

In order to construct an image processing system which can automatically expand compressed image signals before times when the same are actually required for edition processing, a system control unit (10) produces a schedule chart for expansion processing on the basis of designation of file names storing image signals to be expanded and edition processing times, being inputted through a keyboard or the like, so that image signals stored in the respective files are completely expanded before the edition processing times and the as-expanded image signals occupy an image signals base (30) for the minimum times. An image signals compression/expansion unit (20) executes expansion processing in accordance with the schedule chart. Thus, it is possible to improve workability of the image processing system.

20 Claims, 17 Drawing Sheets

FIG. 6

CURRENT TIME 7:10:9:00

| NO. | JOB NAME | FILE NAME (Fi) | EDITION STARTING TIME (Ti) (MONTH: DAY: HOUR: MINUTE) | QUALITY LEVEL ($Q_i$) |
|---|---|---|---|---|
| 1 | A1 | A11 | — | 1 |
| 2 | A1 | A12 | — | 2 |
| 3 | B1 | B11 | 7 : 10 : 12 : 50 | 2 |
| 4 | B1 | B12 | 7 : 10 : 12 : 50 | 2 |
| 5 | B1 | B13 | 7 : 10 : 12 : 50 | 2 |
| 6 | B2 | B21 | 7 : 10 : 12 : 50 | 2 |
| 7 | B2 | B22 | 7 : 10 : 12 : 50 | 2 |
| 8 | B2 | B23 | 7 : 10 : 12 : 50 | 2 |

USER ATTRIBUTE DATA PART

FIG. 7

| NO | FILE NAME Fi | COMPRESSION/ NON-COMPRESSION | DATA QUANTITY Mi (MB) | PROCESSING TIME Ci (sec.) | EXPANSION STARTING TIME Si (MONTH DAY HOUR MINUTE SECOND) |
|---|---|---|---|---|---|
| 1 | A11 | NON-COMPRESSION | 7.0 | 140 | — |
| 2 | A12 | NON-COMPRESSION | 6.0 | 120 | — |
| 3 | B11 | COMPRESSION | 11.0 | 110 | 7 : 10 : 12 : 42 : 50 |
| 4 | B12 | COMPRESSION | 3.0 | 30 | 7 : 10 : 12 : 44 : 40 |
| 5 | B13 | COMPRESSION | 5.0 | 50 | 7 : 10 : 12 : 45 : 10 |
| 6 | B21 | COMPRESSION | 6.0 | 60 | 7 : 10 : 12 : 46 : 00 |
| 7 | B22 | COMPRESSION | 8.0 | 80 | 7 : 10 : 12 : 47 : 00 |
| 8 | B23 | COMPRESSION | 10.0 | 100 | 7 : 10 : 12 : 48 : 20 |

SYSTEM CONTROL INFORMATION PART

FIG. 9

| NO. | FILE NAME (Fi) | EDITION PROCESSING TIME (Ti) (MONTH:DAY:HOUR:MINUTE) | EXPANSION STARTING TIME (Si) (MONTH:DAY:HOUR:MINUTE:SECOND) |
|---|---|---|---|
| 1 | A11 | — | — |
| 2 | A12 | — | — |
| 3 | B11 | 7:10:12:00 | 7:10:11:56:50 |
| 4 | B12 | 7:10:12:00 | 7:10:11:58:40 |
| 5 | B13 | 7:10:12:00 | 7:10:11:59:10 |
| 6 | B21 | 7:10:12:30 | 7:10:12:27:40 |
| 7 | B22 | 7:10:12:30 | 7:10:12:28:40 |
| 8 | B33 | 7:10:12:50 | 7:10:12:48:20 |

FIG. 14

| NO. | FILE NAME (Fi) | IMAGE SIGNAL COMPRESSION/ EXPANSION UNIT | EDITION PROCESSING TIME (Ti) (MONTH:DAY:HOUR:MINUTE) | EXPANSION STARTING TIME (Si) (MONTH:DAY:HOUR:MINUTE:SECOND) |
|---|---|---|---|---|
| 1 | A11 | — | — | — |
| 2 | A12 | — | — | — |
| 3 | B11 | 201 | 7:10:12:50 | 7:10:12:47:40 |
| 4 | B12 | 201 | 7:10:12:50 | 7:10:12:49:30 |
| 5 | B13 | 202 | 7:10:12:50 | 7:10:12:47:30 |
| 6 | B23 | 202 | 7:10:12:50 | 7:10:12:48:20 |
| 7 | B21 | 203 | 7:10:12:50 | 7:10:12:47:40 |
| 8 | B22 | 203 | 7:10:12:50 | 7:10:12:48:40 |

Rows 3–4: G1; Rows 5–6: G2; Rows 7–8: G3

FIG. 16

| NO | FILE NAME Fi | COMPRESSION/ NON-COMPRESSION | JOB NAME | PROCESSING TIME Ci (SEC) | EXPANSION STARTING TIME Si (MONTH.DAY.HOUR.MINUTE.SECOND) |
|----|------|------|------|------|------|
| 1 | A11 | NON-COMPRESSION | A1 | 140 | — |
| 2 | A12 | NON-COMPRESSION | A1 | 120 | — |
| 3 | B11 | COMPRESSION | B1 | 110 | 7 : 10 : 12 : 46 : 50 |
| 4 | B12 | COMPRESSION | B1 | 30 | 7 : 10 : 12 : 48 : 40 |
| 5 | B13 | COMPRESSION | B1 | 50 | 7 : 10 : 12 : 49 : 10 |
| 6 | B21 | COMPRESSION | B2 | 60 | 7 : 10 : 12 : 46 : 00 |
| 7 | B22 | COMPRESSION | B2 | 80 | 7 : 10 : 12 : 47 : 00 |
| 8 | B23 | COMPRESSION | B2 | 100 | 7 : 10 : 12 : 48 : 20 |

Rows 3–5: G1' (201). Rows 6–8: G2' (202).

SYSTEM CONTROL INFORMATION PART

SYSTEM AND METHOD OF IMAGE PROCESSING

BACKGROUND OF THE INVENTION

1. Field of the Invention

The present invention relates to an image processing system employed for edition processing such as layout processing of image data, and more particularly, it relates to an image processing system for expanding compressed binary or multilevel images before edition processing starting times.

2. Description of the Background Art

In relation to conventional prepress and printing steps, attempts have been positively made for improving the quality and saving the labor with development of units such as a scanner, a layout system, a computerized phototypesetter, an image data base and the like. Such units are still being actively developed, in order to further improve the function, reduce the cost and improve the operability.

On the other hand, an image processing system is also under active development, in order to construct a local area network (LAN) by connecting such units by a communication cable, compress/expand a large quantity of image data read by a scanner or the like, and electronize edition processing such as retouching, page make-up and layout operations. In particular, a technique of compressing image data, which serves as a key technology in such an image processing system, has been deeply studied, to make it possible to apply an international standardization system (Joint Photographic Expert Group) to printing as a compression system for binary and multilevel images. Thus, an image processing system which can compress and expand image data is now being put into practice.

However, a conventional image processing system has the following problem:

The conventional image processing system inevitably requires a skillful operator, who must manage overall image data processing in prepress steps. For example, the operator must decide image data compression/expansion schedules in relation to the times for compressing the image data, the times for expanding the compressed image data for transmitting the as-expanded image data to a layout system or the like, in image data compression/expansion processing on the basis of his knowledge and experience.

Thus, the operator has a heavy burden, while the compressed image data may be frequently expanded and continuously stored in an image data base considerably before times when the compressed image data are actually required for edition processing or the like. Thus, a large quantity of image data which are not yet necessary in time may occupy the image data base, to disadvantageously deteriorate the workability of the image processing system.

Such a problem arises not only in processing for compressing/expanding image data in the prepress steps, but also in the overall image processing system for compressing a large quantity of image data and thereafter processing the compressed image data at need.

SUMMARY OF THE INVENTION

The present invention has been proposed in order to solve the aforementioned problem, and a primary object thereof is to provide an image processing system and a compression/expansion processing control method in which image signals are automatically expand before the times when such image signals are actually required so that the as-expanded image signals occupy image signals storage means for the minimum times.

A second object of the present invention to provide an image processing system and a compression/expansion processing control method in which image signals are automatically compressed while expansion processing is not performed.

A third object of the present invention to provide an image processing system and a compression/expansion processing control method in which each image compression/expansion unit effectively operates so that occupation time of expanded image signals in memory means is minimized.

The present invention is directed to an image processing system for expanding compressed image signals to obtain expanded image signals which are to be subjected to image edition processing from predetermined first time points, respectively. The system comprises: (a) first memory means for storing the compressed image signals; (b) means for expanding the compressed image signals in accordance with an expansion processing schedule to obtain the expanded image signals, wherein expansion of the compressed image signals are started from respective second time points; (c) second memory means for storing the expanded image signals; and (d) means for reading the expanded image signals out of the second memory means to output the expanded image signals to an image editor; wherein the means (b) comprises: (b-1) means for inputting sets of signals, each set including: a first information signal designating one of the compressed image signals; and a second information signal representing one of the first time points corresponding the one of the compressed image signals; (b-2) means for calculating the second time points as a function of the sets of signals such that: respective time periods during which the expanded image signals are stored in the second memory means are minimized under the condition that respective expansions of the compressed image signals are terminated before the first time points, respectively; and (b-3) means for determining the expansion processing schedule as a function of the second time points.

The present invention is also directed to a method of expanding compressed image signals to obtain expanded image signals which are to be subjected to image edition processing from predetermined first time points, respectively. The method comprises the steps of: (a) storing the compressed image signals in first memory means; (b) expanding the compressed image signals in accordance with an expansion processing schedule to obtain the expanded image signals, wherein expansion of the compressed image signals are started from respective second time points; (c) storing the expanded image signals in second memory means; and (d) reading the expanded image signals out of the second memory means to output the expanded image signals to an image editor; wherein the step (b) comprises the steps of: (b-1) inputting sets of signals, each set including: a first information signal designating one of the compressed image signals; and a second information signal representing one of the first time points corresponding the one of the compressed image signals; (b-2) calculating the second time points as a function of the sets of signals such that: respective time periods during which the expanded image signals are stored in the second memory means are minimized under the condition that respective expansions of the compressed image signals are terminated before the first time points, respectively; and (b-3) determining the expansion processing schedule as a function of the second time points.

The inventive image processing system of the aforementioned structure has the following effects:

First, it is possible to control the operation of the expansion processing means as well as transmission of image signals between the expansion processing means and the first and second memory means for editing the compressed image signals in a unified manner by the input means and the means for determining the schedule for the expansion processing. Thus, the operator may simply input the times for editing the image signals so that the compressed image signals are thereafter automatically expanded and the as-expanded image signals are automatically stored in the second memory means before the edition processing starting times. Thus, it is possible to reduce the burden of the operator and save the labor for the operation.

Second, the compressed image signals are expanded at the closest possible times to the corresponding edition processing starting times, whereby it is possible to minimize the times for the as-expanded image signals to occupy the second memory means. Consequently, it is possible to prevent the second memory means from holding the as-expanded image signals for excess times, whereby the workability of the image processing system can be improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a schematic diagram showing a user attribute data part;

FIG. 7 is a schematic diagram showing a system control information part;

FIG. 9 is a schematic diagram showing edition processing times and an expansion processing starting times;

FIG. 14 is a schematic diagram showing edition processing times and expansion starting times;

FIG. 16 shows contents stored in the system control information part where expansion processing is performed for each job.

DESCRIPTION OF THE PREFERRED EMBODIMENTS

(A) Electrical Structure of the System

Figure 1:
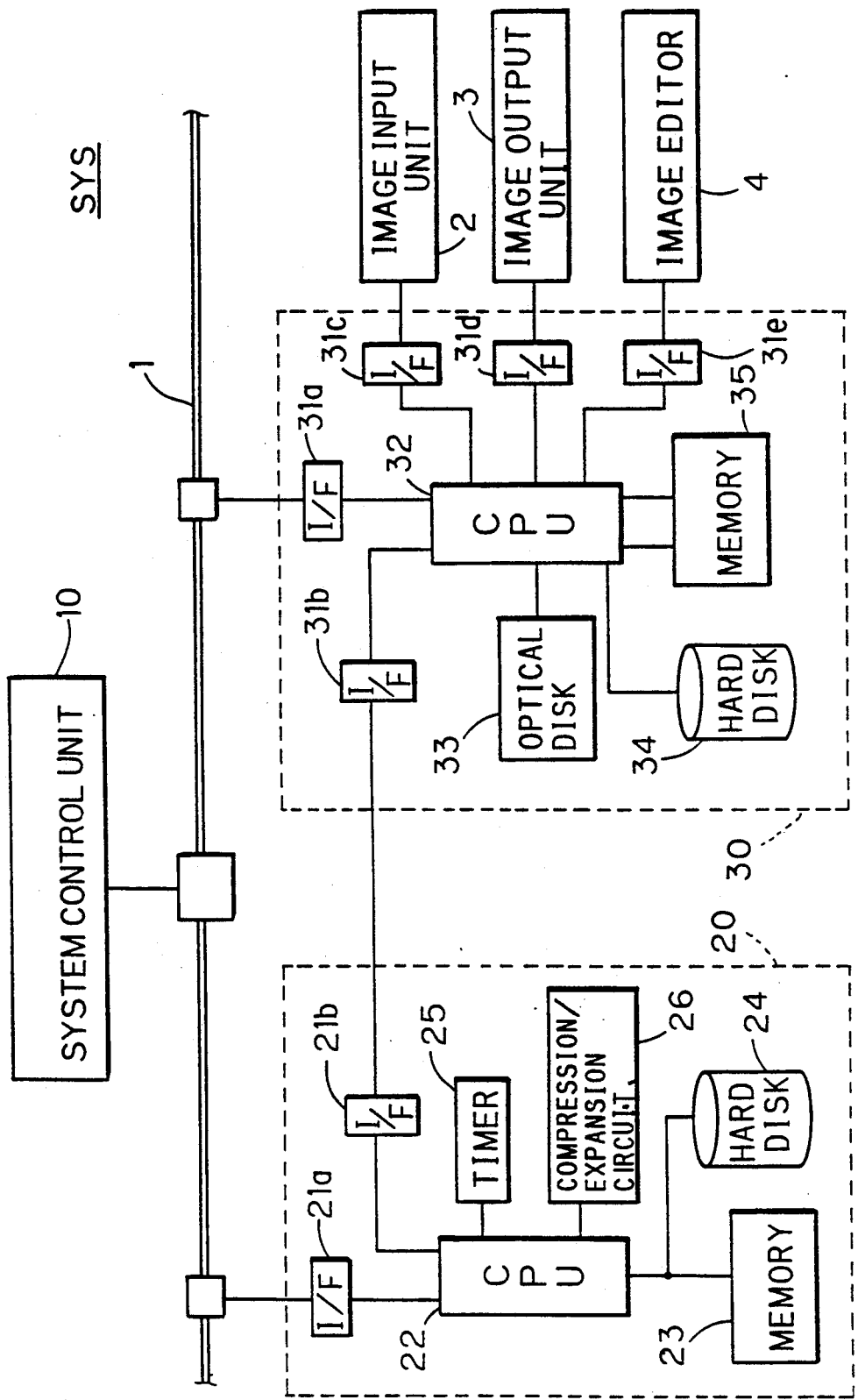
FIG. 1 is a block diagram showing the structure of an image processing system according to an embodiment of the present invention.

FIG. 1 is a block diagram schematically showing the electrical structure of an image processing system SYS according to an embodiment of the present invention.

As shown in FIG. 1, the system SYS generally comprises a system control unit 10, an image signals compression/expansion unit 20 and an image signals data base 30. These units are connected with each other by a communication cable 1, so that the image processing system SYS forms a local area network (LAN).

The image signals data base 30 is connected with image input unit 2 and image output unit 3 which are formed by communication devices such as scanners or facsimiles, and an image editor 4 which is formed by a layout system or the like. Thus, image signals which are read or produced by the image input unit 2 are transmitted to and stored in the image signals data base 30, so that the image editor 4 receives the image signals, which are expanded by the system SYS as hereinafter described, from the image signals data base 30 to carry out prescribed edition processing such as retouching or a page make-up operation. The image signals thus edited by the image editor 4 are again transmitted to the image signals data base 30 and outputted from the image output unit 3, to expose a film, for example.

The structures of the units 10, 20 and 30 are now described.

Figure 2:
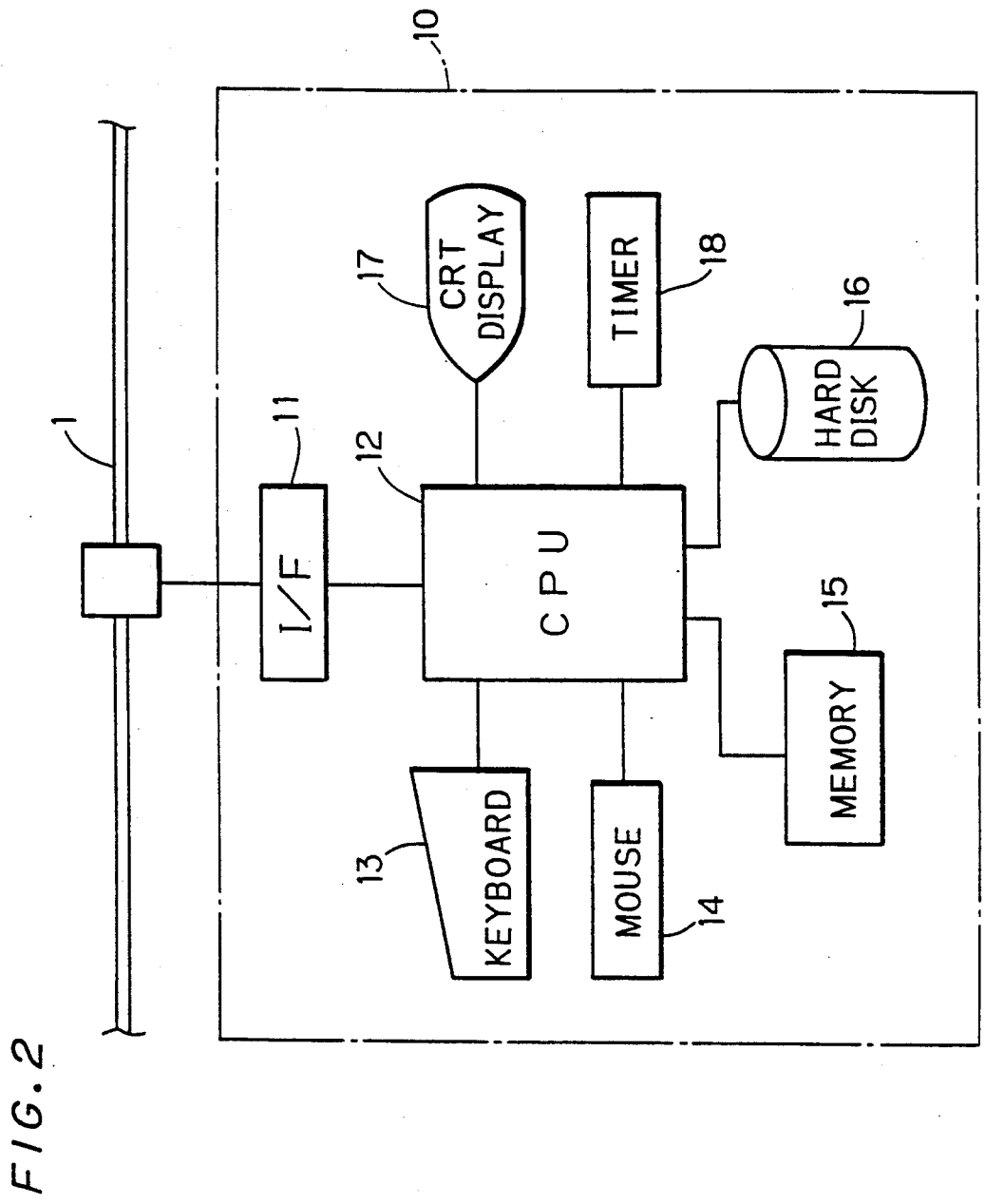
FIG. 2 is a block diagram showing the structure of a system control unit of the image processing system according to the embodiment of the present invention.

FIG. 2 is a block diagram showing the electrical structure of the system control unit 10, which is formed by a general work station, a personal computer or the like. Referring to FIG. 2, a CPU 12 is connected with input units which are formed by a keyboard 13 and a mouse 14, so that instructions are supplied from an operator to the CPU 12 through these input units. The CPU 12 is connected with a memory 15, a hard disk (hereinafter referred to as HD) 16 and a CRT display 17. The CPU 12 performs prescribed operations along times indicated by a timer 18, to generate prescribed command signals. The command signals generated from the CPU 12 are transmitted to the image signals compression/expansion unit 20 and the image signals data base 30 through an interface (hereinafter referred to as I/F) 11 by the communication cable 1.

On the other hand, the image signals compression/expansion unit 20 has a CPU 22 which performs operations and outputs commands along times indicated by a timer 25, a memory 23 which stores the command signals received from the system control unit 10 and the like, an HD 24 which stores OS, image signals and the like, and a compression/expansion circuit 26 which compresses and expands the image signals in response to the commands from the CPU 22. The compression/expansion circuit 26 is formed by a dedicated LSI, a general RISC chip, or the like. This image signals compression/expansion unit 20 is connected with the image signals data base 30, whereby the image signals are transferred between these units 20 and 30 through dedicated high-speed I/Fs 21b and 31b of SCSI or the like, for example.

The image signals data base 30 comprises an I/F 31a which converts the command signals received from the system control unit 10 through the communication cable 1 and the like, and an optical disk 33 and an HD 34 for storing the image signals received from the image input unit 2 or the image editor 4, compressed image signals and expanded image signals transmitted from the image signals compression/expansion unit 20, and the like. The image signals data base 30 is further provided with a memory 35 for storing the command signals generated from the system control unit 10, various data and the like, and I/Fs 31c, 31d and 31e for the image input unit 2, the image output unit 3 and the image editor 4.

(B) Operation Procedure of the System

Figure 3:
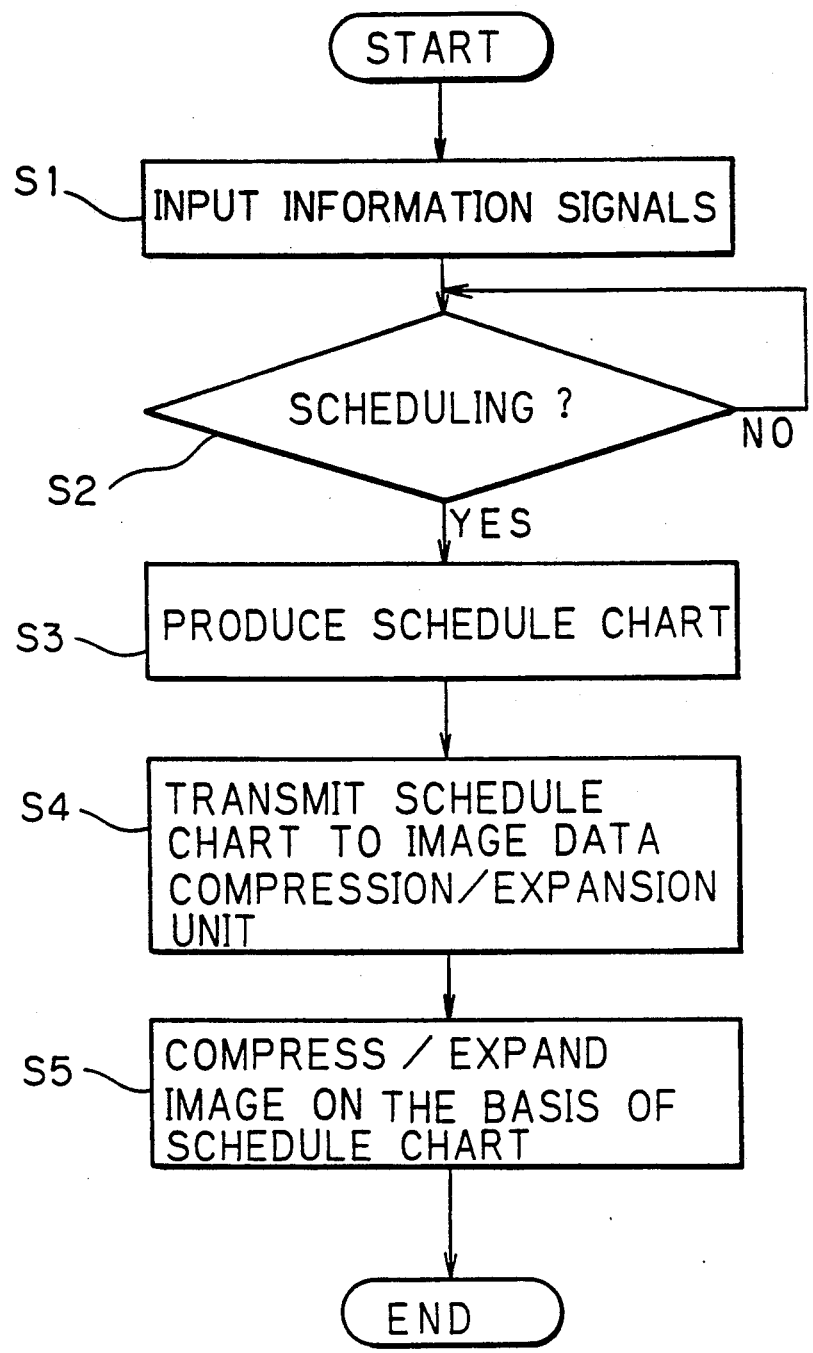
FIG. 3 is a flow chart showing an operation procedure of the image processing system.
Figure 4:
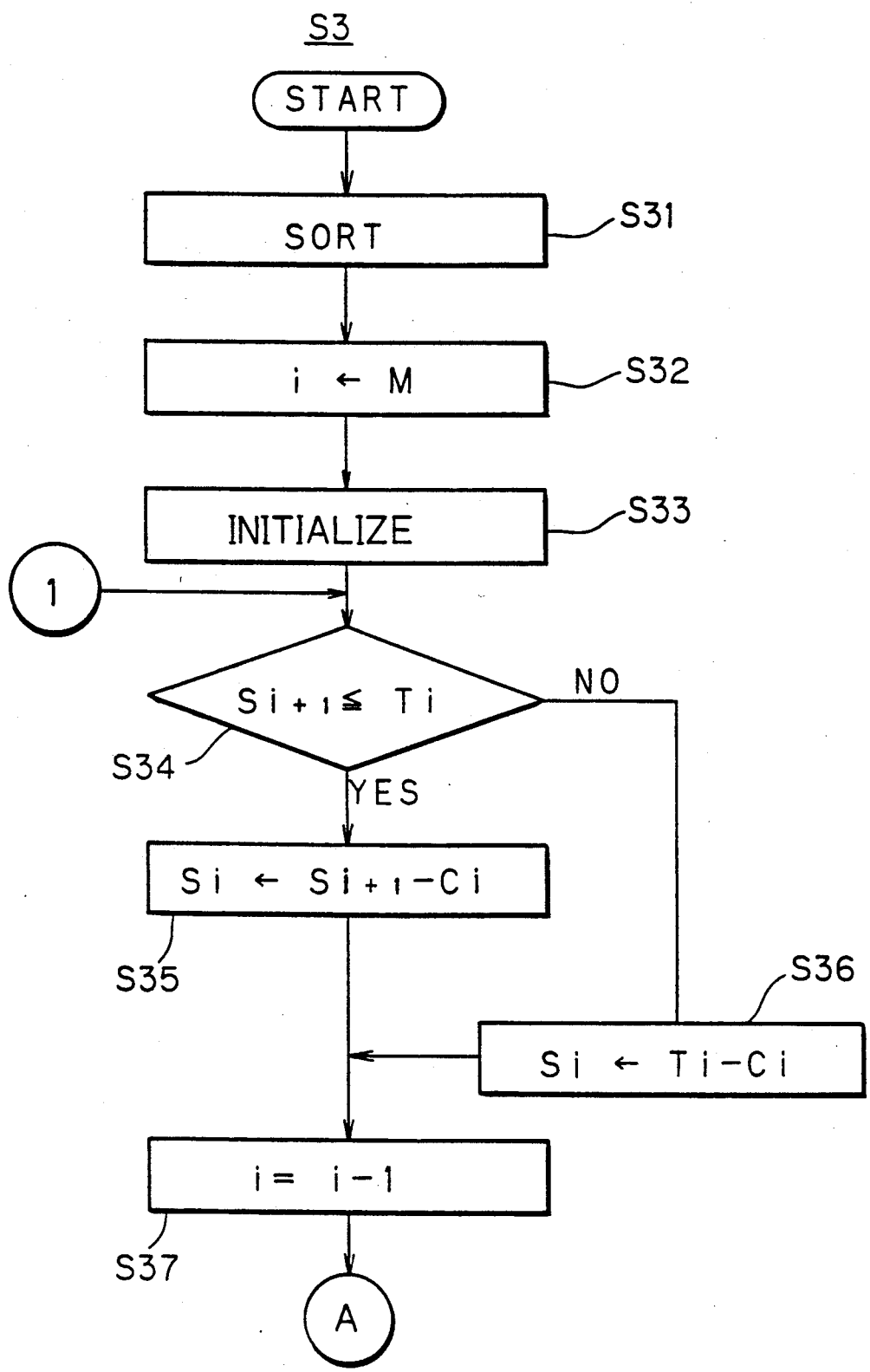
FIG. 4 is a flow chart showing the operation procedure of the image processing system.
Figure 5:
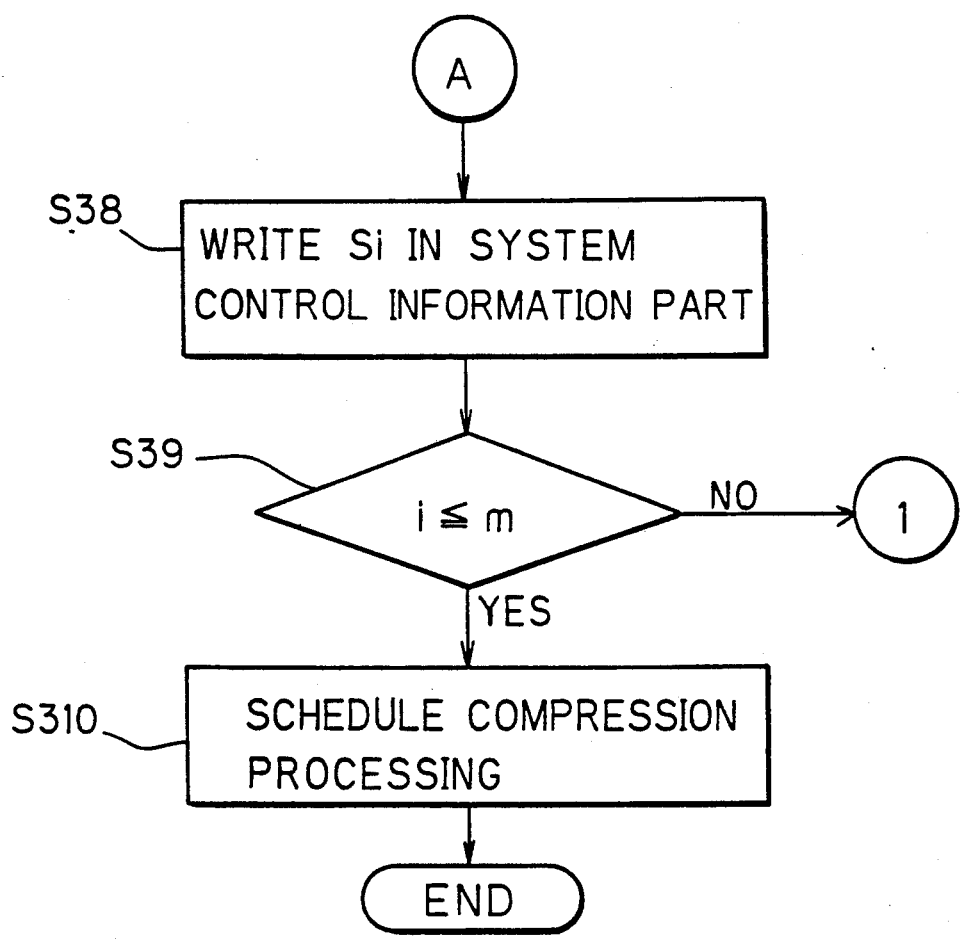
FIG. 5 is a flow chart showing the operation procedure of the image processing system.

The concept of the system SYS having the aforementioned structure is adapted to produce a compression/expansion schedule data for optimumly expanding the compressed image signals in the system control unit 10 before the images are communicated between the image signals compression/expansion unit 20 and the image signals data base 30 by a prescribed method, in order to control expansion processing in the image signals compression/expansion unit 20 in accordance with the schedule data. The system SYS is further adapted to effectively apply idle times, resulting from such production of the schedule data in relation to expansion processing of the compressed image signals, to compression of uncompressed image signals being stored in the image signals data base 30 by the image signals compression/expansion unit 20. The operation procedure of the system SYS is now described with reference to flow charts shown in FIGS. 3 to 5. FIGS. 4 and 5 are flow charts showing the content of a step S3 in FIG. 3 in detail.

(1) At a step S1, data required for producing the schedule are inputted.

FIG. 6 illustrates a user attribute data part corresponding to an input part of the aforementioned compression/expansion schedule data, with items of data to be written by the operator through the keyboard 13 or the mouse 14 and the values of the actually written data information signals. This user attribute data part of the compression/expansion schedule data is displayed on the CRT display 17. As shown in FIG. 6, the operator must input numbers (No.), job names, file names (Fi), edition starting times (Ti) and quality levels (Qi). The respective items are defined as follows:

Numbers (No.): File management numbers.

Job Names: The job names are so alloted that each unit is formed by image signals required for editing image signals for one page.

File Names (Fi): File names of image signals (including both of uncompressed and compressed image signals) stored in the HD 34 of the image signals data base 30 and the like.

Edition Starting Times (Ti): Times for starting edition such as layout processing with image editor 4. The compressed image signals being stored in the corresponding file names Fi must be expanded and stored in the HD 34 of the image signals data base 30 or the like before the times Ti.

Quality Levels (Qi): Parameters required for compression indicate degrees of deterioration of picture quality, which may be caused when an irreversible compression system such as vector quantization or the like used as a technique of compressing multilevel image signals is employed, in five stages. For example, the picture quality is best but the compressibility is minimized at a quality level $Qi=1$, while the picture quality is worst but the compressibility is maximized at a quality level $Qi=5$. The values of the quality levels Qi are determined by programs of compression and the like.

Surveying FIG. 6 on the basis of the aforementioned definition, image signals stored in files A11 and A12 are uncompressed and preferably compressed as soon as possible, but the same are not regarded as urgent targets of edition processing. These image signals are to be compressed during a period between the current time of July 10, 9:00 indicated by the timer 18 and a time for starting expansion processing of compressed image signals. As to the files A11 and A12, since compression processing is not under the influence of edition processing, no data are entered in the items of the edition starting times Ti.

On the other hand, image signals stored in files B11 (No. 3) to B23 (No. 8) have been compressed by the image signals compression/expansion unit 20 before the current time of July 10, 9:00, to be edited by the operator. Referring to FIG. 6, edition processing of the compressed image signals stored in the files B11 to B23 is assumed to be started at the same time of July 10, 12:50. However, the present invention is also applicable to such a case that compressed image signals stored in respective files are edited at different times as a matter of course, as described later.

Since the image signals are expanded on the basis of data such as programs and parameters employed during compression, no data are input by the operator in the items of the quality levels Qi as to the file numbers Fi to be expanded. Namely, the CPU 12 automatically enters the data in the items Qi when the operator inputs the file numbers Fi. Referring to FIG. 6, the file names B11 to B23 are uniformly supplied with values of 2.

(2) Step 2

After the information signals (data) are completely entered in the user attribute part, a determination is made as to whether or not the inputted information signals are to be scheduled. If the determination is of YES, the operator supplies a signal corresponding to this determination to the CPU 12 through the keyboard 13 or the mouse 14. In response to this signal, the CPU 12 schedules the data.

(3) Step 3

The compression/expansion schedule data is produced along the procedure shown in FIGS. 4 and 5. Calculated datas are set in a system control information part (output part of the compression/expansion schedule data) shown in FIG. 7 every scheduling.

Definition of the respective items shown in the system control information part is now described, and thereafter the scheduling operation is described in detail with reference to the flow charts shown in FIGS. 4 and 5 and the information signals shown in the system control information part of FIG. 7.

Compression/Non-Compression: This item expresses current attributes of the image signals stored in the files Fi. The CPU 12 decides and sets displays for uncompressed original files as "non-compression" and those for compressed files as "compression" on the basis of information contained therein.

Data Quantity Mi (mega byte): This item expresses data quantities in the case of original (uncompressed) signals stored in the respective files Fi, which are employed for calculating times required for compression and expansion.

Processing Time Ci (sec.): This item expresses times required for compressing or expanding the image signals stored in the files Fi, which are calculated as follows: Assuming that $\alpha_1$ represents the longest time required for compressing data of 1 MB and $\alpha_2$ represents the longest time required for expanding signals of 1 MB, each processing time Ci is obtained as follows:

(i) In Compression: $Ci = Mi \times \alpha_1$
(ii) In Expansion: $Ci = Mi \times \alpha_2$ As to the values $\alpha_1$ and $\alpha_2$, data measured by actual simulation are employed. Referring to FIG. 7, it is assumed that $\alpha_1 = 20$ (sec./MB) and $\alpha_2 = 10$ (sec./MB).

Expansion Starting Time Si: Times for starting expansion processing of the respective files Fi, each of which is calculated as follows:

(i) $S_{i+1} > Ti$ or with no presence of $S_{i+1}$: $Si = Ti - Ci$
(ii) $S_{i+1} \leq Ti$: $Si = S_{i+1} - Ci$

1) Step S31

The files Fi are sorted in order of "non-compression" and "compression" from that of the earliest edition starting time Ti. FIG. 7 shows the sorted system control information part.

2) Step S32

The numbers M of the files Fi are entered as the variables i of the files Fi. This operation is automatically carried out by the CPU 12 in accordance with the program. Referring to FIG. 7, M is equal to 8.

3) Step S33

A virtual initial value $S_{M+1}$ is set. This value, which is the expansion processing starting time for the file Fi of No. (M+1) being not actually edited, is set at a value sufficiently larger than the edition processing time Ti for the file Fi of No. M (file B23 in FIG. 7).

4) Steps S34 to S39

The expansion starting times Si for the files Fi are obtained successively from that of No. M to that of No. (m+1) having the earliest edition processing time Ti. Referring to FIG. 7, the number m of non-compressed signal is 2, and hence the expansion starting times Si are obtained successively from the file B23 to the file B11. Namely, the CPU 12 writes the as-obtained times Si in the system control information part assuming that the expansion starting times Si are provided by $S_{i+1} - Ci$ if $S_{i+1}$ is not larger than Ti (steps S34 and S35) while assuming that the expansion starting times Si are provided by $Ti - Ci$ if $S_{i+1}$ is larger than Ti (step S38).

Referring to FIG. 7, no expansion starting time Si is obtained at the step S36 since edition processing of the files Fi (B11 to B23) is started at the same edition starting time Ti.

When such a determination is made that the file No. i is not more than m, the series of procedures for obtaining the expansion processing starting times Si is completed (step S39).

5) Step S310

Then, the compression processing is scheduled. Since compression processing of the files A11 and A12 has no relation with edition processing of the files B11 to B23, the files A11 and A12 are compressed during an idle time resulting from the scheduled expansion processing. Referring to FIG. 7, the processing times Ci for the files A11 and A12 are 140 seconds and 120 seconds respectively, whereby a sufficient time is left even if these files A11 and A12 are compressed in a period between the current time of July 10, 9:00 and the processing starting time of July 10, 12:42:50 for the file B11. Therefore, no particular scheduling for compression processing is performed in this case, but the files A11 and A12 are immediately compressed from the current time by the image signals compression/expansion unit 20.

(4) Step S4

When the compression/expansion schedule data is produced at the step S3, the CPU 12 transfers the respective data signals of the compression/expansion schedule data to the image signals compression/expansion unit 20 and the image signals data base 30 through the communication cable 1, so that the data are stored in the memories 23 and 35 respectively.

(5) Step S5

The image signals compression/expansion unit 20 reads out the files Fi to be expanded from the image signals data base 30 on the basis of the compression/expansion schedule data and the times indicated by the timer 25, to expand the same.

Figure 8:
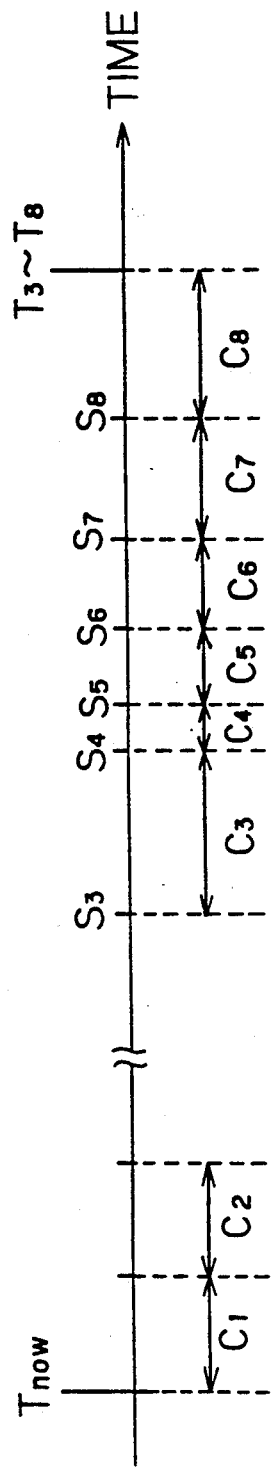
FIG. 8 is a schematic diagram illustrating the content of a schedule with a time base.

FIG. 8 shows an example corresponding to FIG. 7. As shown in FIG. 8, the files Fi of Nos. 3 to 8 are entirely expanded in this order before the edition starting time Ti (T3=T4=...=T8). The files Fi of Nos. 1 and 2 are compressed from the current time $t_{now}$ since the total sum (C1+C2) of the respective processing times satisfies a condition of $(S3 - T_{now}) > (C1 + C2)$.

Figure 10:
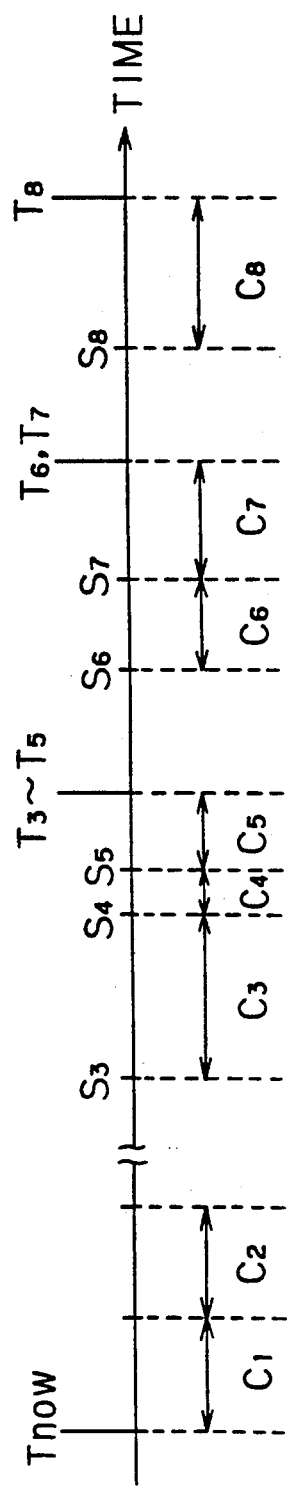
FIG. 10 is a schematic diagram showing the content of another schedule with a time base.

While the files Fi to be expanded are entirely edited at the same time in the aforementioned embodiment, the present invention is not restricted to this but it is possible to produce a compression/expansion schedule data on the basis of the aforementioned principle also when the files Fi are edited at different times. FIGS. 9 and 10 show such an example.

FIG. 9 shows edition processing times Ti of a user attribute data part and expansion starting times Si of a system information control part in contrast, for the purpose of convenience. As shown in FIG. 9, files B11 to B13, files B21 and B22, and a file B33 are to be edited on July 10, 12:00, July 10, 12:30 and July 10, 12:50 respectively. Thus, the expansion starting times Si for the respective files Fi are calculated by $Si = Ti - Ci$ at the step S36 in FIG. 4 as to the files B33, B22 and B13, and by $S_{i+1} - Ci$ at the step S35 in FIG. 4 as to the remaining files respectively.

FIG. 10 illustrates compression/expansion performed on the basis of the scheduling shown in FIG. 9 on a time base. The file B33 of No. 8 is expanded during a period between times S8 and T8 and the files B21 and B22 of Nos. 6 and 7 are expanded during a period between times S6 and T7 (=T6), while the files B11 to B13 of Nos. 3 to 5 are expanded during a period between times S3 and T5 (=T3=T5) respectively. Further, the files A11 and A12 of Nos. 1 and 2 are compressed in the left period between the time $T_{now}$ and S3.

(C) Modifications

Figure 17:
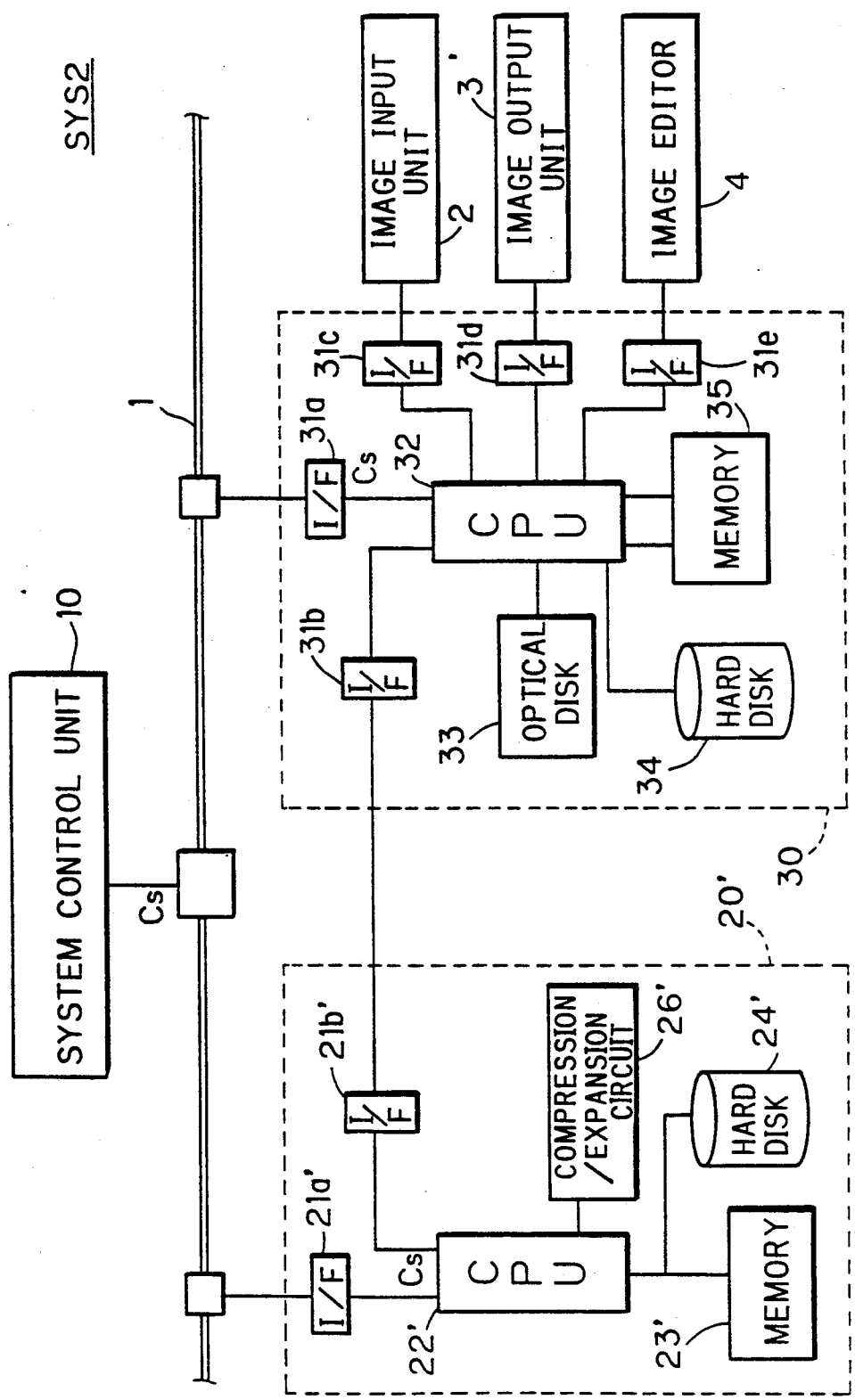
FIG. 17 is a block diagram of an image processing system according to another embodiment of the present invention.

1) In the image processing system SYS shown in FIG. 1, the respective data of the compression/expansion schedule data are transmitted to the memories 23 and 35 of the image signals compression/expansion unit 20 and the image signals data base 30 from the CPU 12 provided in the system control unit 10 through the communication cable 1. However, the present invention is not restricted to this but the CPU 12 may directly transmit command signals Cs for compression/expansion to the CPUs 22 and 32 provided in the units 20 and 30 through the communication cable 1 when the timer 18 provided in the system control unit 10 indicates the expansion starting times Si. In this case, no timer 25 is required for each image signals compression/expansion unit (FIG. 17). Even if a plurality of image signals compression/expansion units 20 are provided in an image processing system SYS1 as shown in FIG. 11, therefore, instructions may be immediately transmitted to those performing no compression/expansion, whereby system control is simplified.

2) While the image processing system SYS shown in FIGS. 1 and 2 performs compression/expansion with only a single image signals compression/expansion unit 20, it is also possible to carry out compression/expansion with a plurality of such image signals compression/expansion units.

Figure 11:
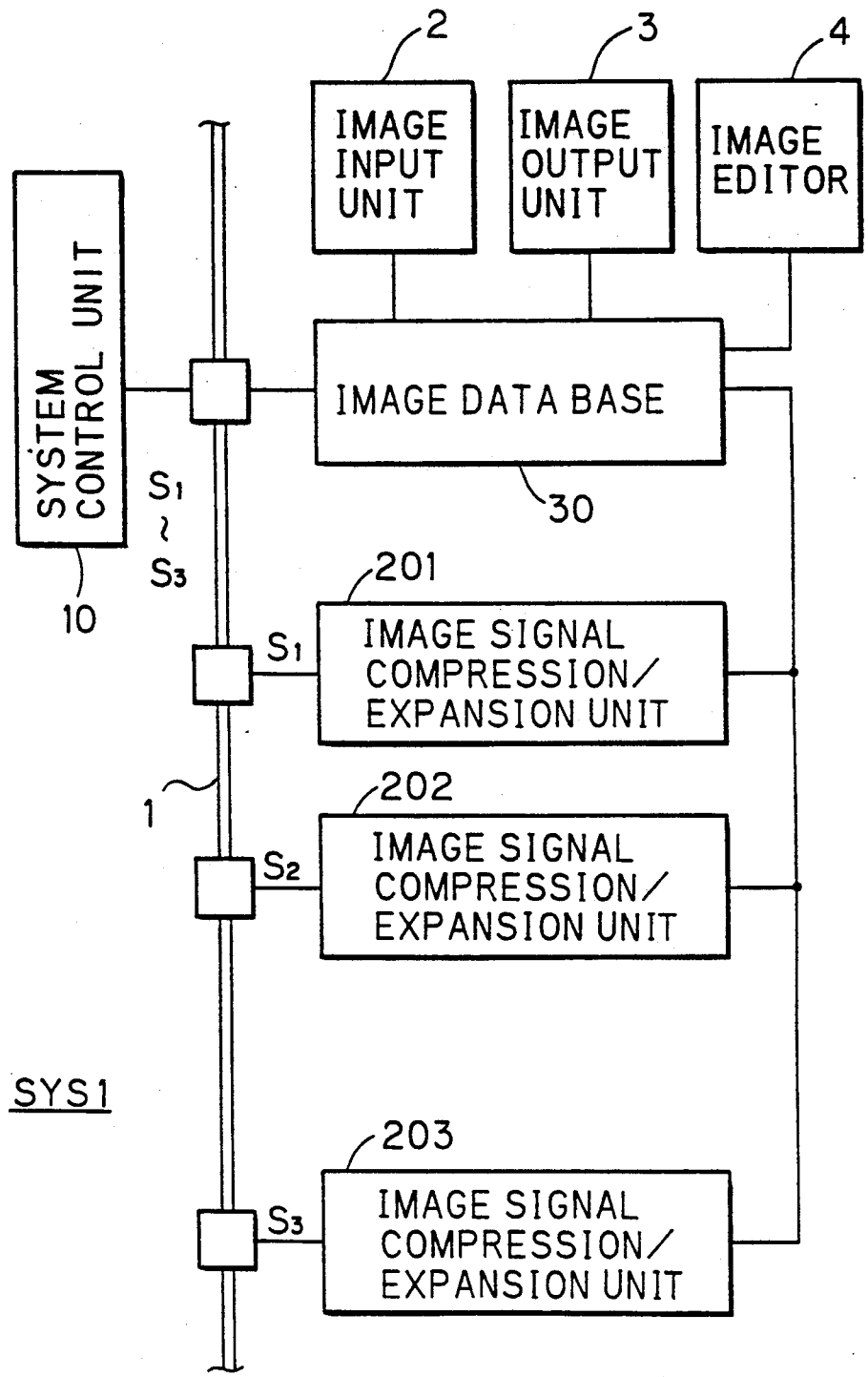
FIG. 11 is a block diagram showing the structure of an image processing system according to another embodiment of the present invention.
Figure 13:
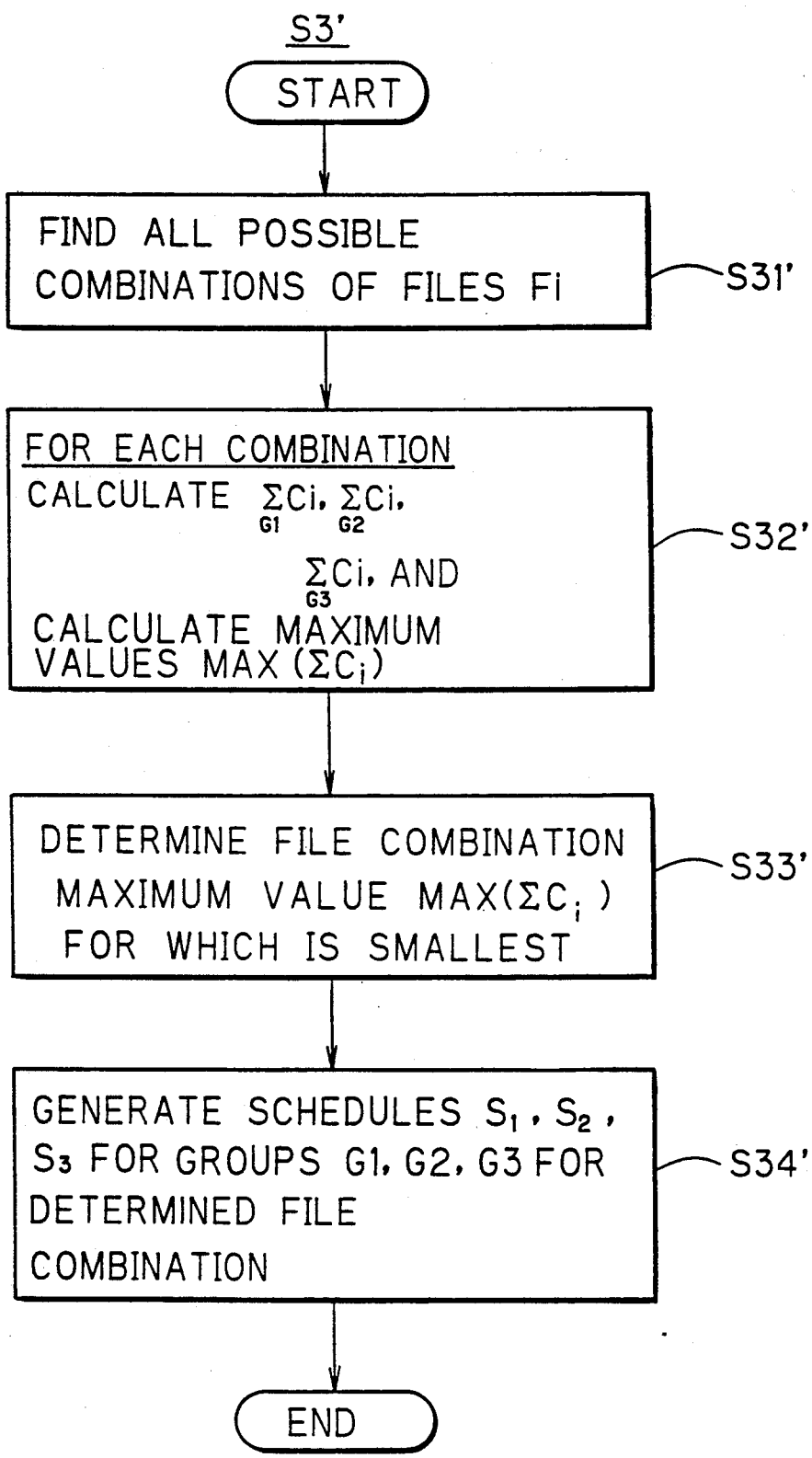
FIG. 13 is a flowchart showing steps of determining a desirable combination of files (i.e., grouping)

For example, the image processing system SYS1 shown in FIG. 11 comprises three image signals compression/expansion units 201, 202 and 203. This system SYS1 schedules compression/expansion as follows (FIG. 12):

Respective files Fi storing compressed image signals to be expanded are classified into three groups G1, G2 and G3 (Step S3'), so that the three image signals compression/expansion units 201, 202 and 203 expand the compressed image signals stored in the files Fi belonging to the groups G1, G2 and G3 respectively. Then, a compression/expansion schedule data is produced by determining combinations of the files Fi as to the respective groups so as to minimize the times for storing the as-expanded image signals in the image signals data base 30 on the basis of processing times Ci obtained as to the respective files Fi (Step S3'). In this case, the schedule of expansion processing in the respective groups G1 to G3 is determined by the same method as that for the aforementioned schedule with the single image signals compression/expansion unit. The contents of the compression/expansion schedule data are now described on the basis of a concrete example (FIG. 13).

Figure 12:
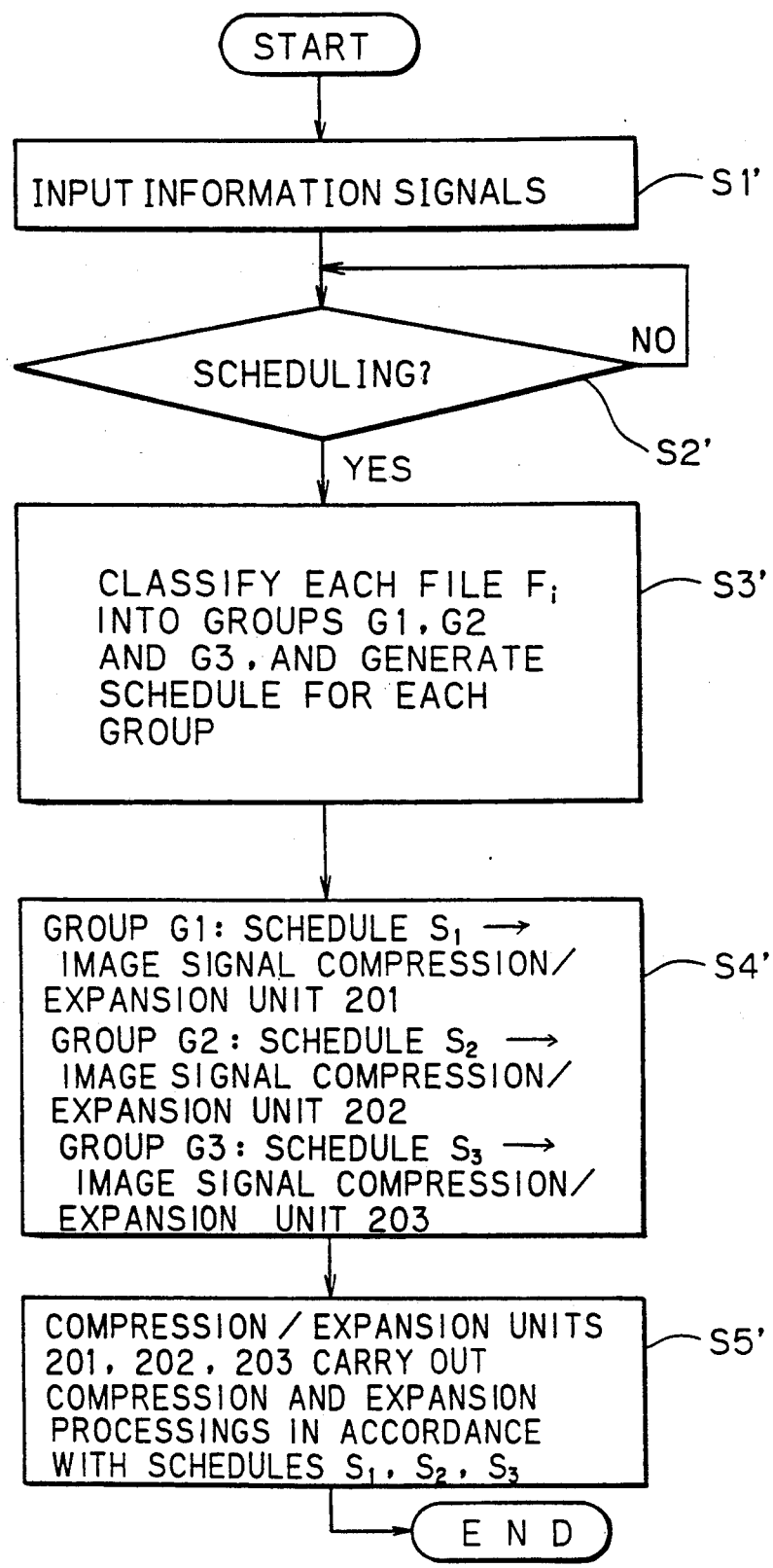
FIG. 12 is a flowchart showing steps of generating a schedule where a plurality of image signal compression/expansion units are provided.

FIG. 12 illustrates an exemplary compression/expansion schedule data produced in relation to the system SYS1. For the purpose of convenience, FIG. 12 illustrates only edition processing times Ti and expansion processing starting times Si in contrast.

As shown in the figure, Files B11 to B23 of Nos. 3 to 8 to be expanded are edited at the same edition starting time Ti of July 10, 12:50. As to such six files B11 to B23, the optimum combination (grouping) of the files Fi for minimizing the times for storing the as-expanded image signals in the image signals data base 30 is determined by obtaining the sum of the processing times Ci with respect to every possible of the files and sequentially obtaining a combination of the files which can minimize the maximum value of the sum of the processing times Ci in each combination (Step S31'-S34').

In other words, the files B11 and B12, the files B13 and B23, and the files B21 and B22 may be classified into the groups G1, G2 and G3 respectively. The sum of the processing times of the files B11 and B12 is 140 seconds as to the group G1 and that of the processing times of the files B13 and B23 is 150 seconds as to the group G2, while that of the processing times of the files B21 and B23 is 140 seconds as to the group G3. Thus, the files B11 and B12 are expanded by the image signals compression/expansion unit 201 and the files B13 and B23 are expanded by the image signals compression/expansion unit 202, while the files B21 and B22 are expanded by the image signals compression/expansion unit 203 respectively (Step S4', S5'). FIG. 12 shows the results of the expansion starting times obtained on the basis of the aforementioned schedule producing method.

Figure 15:
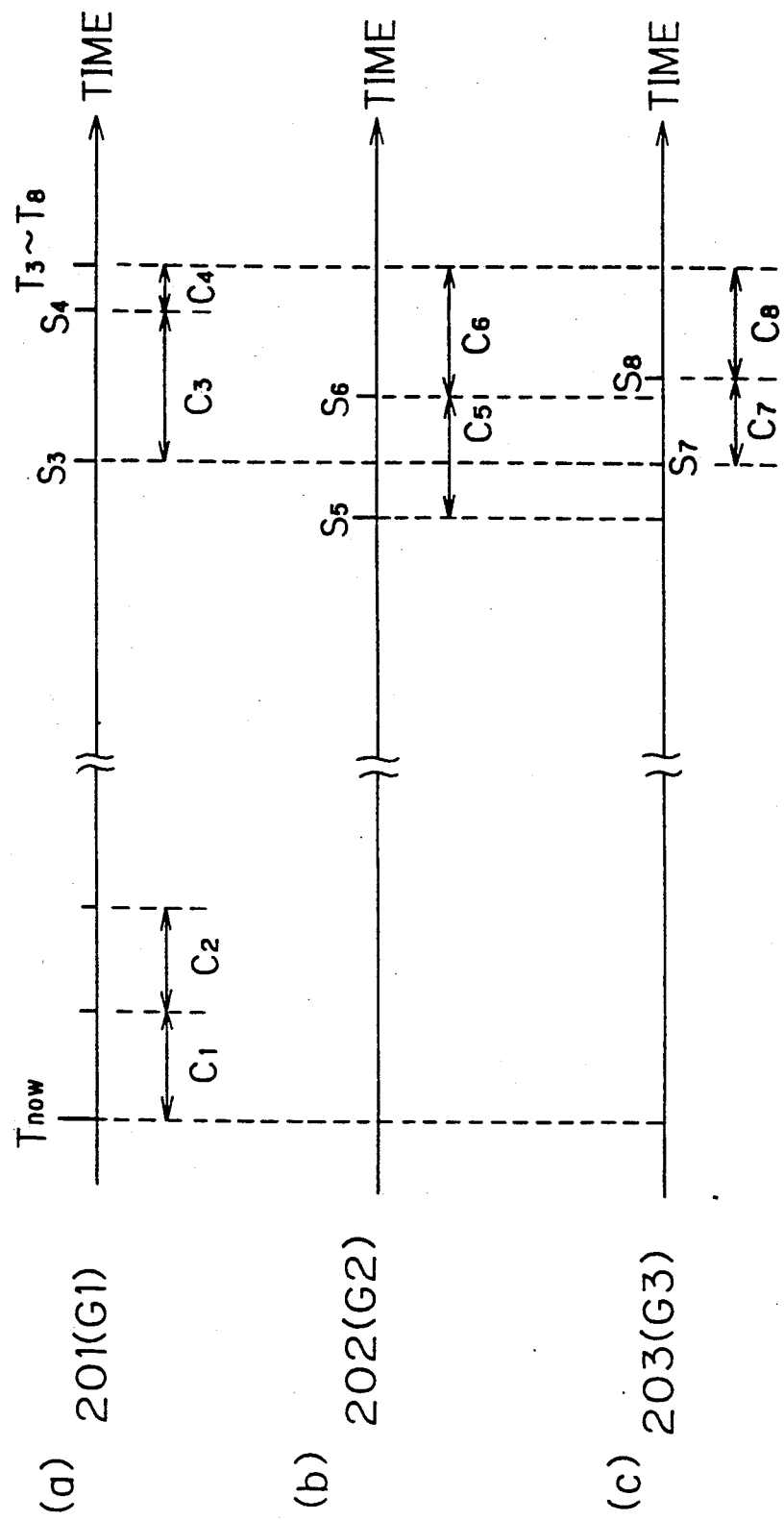
FIGS. 15(a)–(c) are a diagram showing compression/expansion processing in each image signal compression/expansion unit in time base.

As understood from FIG. 12, the first expansion starting time Si is July 10, 12:47:30 for the file B13. Thus, the image signals data base 30 is occupied by the as-expanded data for a shorter time as compared with the image processing system SYS shown in FIGS. 1 and 2, whereby workability of the image processing system SYS1 can be improved. For better understanding, Processing in each image signal compression/expansion unit is shown in time base in FIG. 15 (a)-(c).

The image signals compression/expansion units may carry out compression/expansion not every file but every unit of jobs, dissimilarly to the above. FIG. 16 shows an example of such a schedule. In the illustrated example, compressed image signals belong to the job B1 are expanded by the image signal compression/expansion unit 201, whereas compressed image signals belong to the job B2 are expanded by the image signal compression/expansion unit 202. In FIG. 16, the edition processing times Ti are equally 21:50, January 10.

3) In the image processing systems SYS and SYS1 shown in FIGS. 1 and 11, original image signals inputted by the image input units 2 are compressed by the image signals compression/expansion units 20, 201, 202 and 203 so that the as-compressed image signals stored in the image signals data bases 30 are thereafter expanded by the image signals compression/expansion units 20, 201, 202 and 203 on the basis of the compression/expansion schedule data. However, it is not necessarily requisite to compress the data in the systems SYS and SYS1, but the original image signals may alternatively be compressed by external units so that the as-compressed data are stored in the image signals data bases 30 to be expanded on the basis of schedule data at any time. Also in this case, it is possible to produce schedule data along the flow charts shown in FIGS. 3 to 6 since the compression processing is not directly related to scheduling.

While the invention has been shown and described in detail, the foregoing description is in all aspects illustrative and not restrictive. It is therefore understood that numerous modifications and variations can be devised without departing from the scope of the invention.

We claim:

1. An image processing system for expanding compressed image signals to obtain expanded image signals which are to be subjected to image edition processing from predetermined first time points, respectively, said system comprising:

(a) first memory means for storing said compressed image signals;

(b) means for expanding said compressed image signals in accordance with an expansion processing schedule to obtain said expanded image signals, wherein expansion of said compressed image signals are started from respective second time points;

(c) second memory means for storing said expanded image signals; and (d) means for reading said expanded image signals out of said second memory means to output said expanded image signals to an image editor;

wherein said means (b) comprises:

(b-1) means for inputting sets of signals, each set including:

a first information signal designating one of said compressed image signals; and a second information signal representing one of said first time points corresponding said one of said compressed image signals;

(b-2) means for calculating said second time points as a function of said sets of signals such that:

respective time periods during which said expanded image signals are stored in said second memory means are minimized under the condition that respective expansions of said compressed image signals are terminated before said first time points, respectively; and (b-3) means for determining said expansion processing schedule as a function of said second time points.

2. The image processing system of claim 1, wherein said means (b-2) comprises:

(b-2-1) means for sorting said sets of signals according to said second time points included respective sets of signals to thereby obtain sorted sets of signals arranged in an ascent order of time values of said first time points;

(b-2-2) means for calculating expansion time periods expected to be required for said respective expansions of said compressed image signals; and (b-2-3) means for serially calculating said second time points as a function of said sorted sets of signals and said expansion time periods in a descent order of time values of said first time points;

3. The image processing system of claim 2, wherein said compressed image signals include m-th to M-th compressed image signals arranged in accordance with said descent order of time values of said first time points, where the numbers "m" and "M" are positive integers satisfying the relation m<M;

said first time points include m-th to M-th values $T_m - T_M$ corresponding to said m-th to M-th compressed image signals, respectively;

said second time points include m-th to M-th values $S_m - S_M$ corresponding to said m-th to M-th compressed image signals, respectively; and said means (b-2-3) comprises;

(b-2-3-1) means for comparing an (i+1)-th value $S_{i+1}$ of said second time points with an i-th value $T_i$ of said first time points to thereby calculate an i-th value $S_i$ of said second time points, where the number "i" is a positive integer satisfying the relation m<i<M.

4. The image processing system of claim 3, wherein said expansion time periods include a i-th value $C_i$ corresponding to an i-th compressed image signal; and said means (b-2-3-1) comprises:

(b-2-3-1-1) means for comparing said (i+1)-th value $S_{i+1}$ of said second time points with said i-th value $T_i$ of said first time points;

(b-2-3-1-2) means for generating a logical signal selectively having first and second logical levels, wherein said first logical level indicates that a first condition:

$$S_{i+1} > T_i$$

is satisfied, while said second logical level indicates that a second condition:

$$S_{i+1} \leq T_i$$

is satisfied;

(b-2-3-1-3) means for obtaining said i-th value $S_i$ of said second time points in response to said first logical level as a function of a difference $(T_i - C_i)$ between said i-th value $T_i$ of said first time points and said i-th value $C_i$ of said expansion time periods; and (b-2-3-1-4) means for obtaining said i-th value $S_i$ of said second time points in response to said first logical level as a function of a difference $(S_{i+1} - C_i)$ between said (i+1)-th value $S_{i+1}$ of said second time points and said i-th value $C_i$ of said expansion time periods.

5. The image processing system of claim 4, wherein said compressed image signals include an (M+1)-th compressed image signal which is not subjected to said image edition;

said second time points include an (M+1)-th value $S_{M+1}$ corresponding to said (M+1)-th compressed image signal; and said means (b-2-3-1) further comprises:

(b-2-3-1-5) means for storing said (M+1)-th value $S_{M+1}$ of said second time points; and (b-2-3-1-6) means for comparing said (M+1)-th value $S_{M+1}$ of said second time points with said M-th value $T_M$ of said first time points.

6. The image processing system of claim 5, further comprising:

(e) means for inputting a non-compressed image signal; and (f) means for compressing said non-compressed image signal in accordance with a compression processing schedule.

7. The image processing system of claim 6, wherein said means (e) comprises:

(e-1) means for storing said non-compressed image signal;

said system further comprising:

(g) means for inputting a third information signal designating said non-compressed image signal;

(h) means for calculating a compression processing time period $C_{com}$ required to compress said non-compressed image signal designated by said third information signal;

(i) means for reading said expansion processing schedule to determine an idle time period during which said expansion of said compressed image signals is not executed; and (j) means for comparing said idle time with said compression processing time period $C_{com}$ to determine said compression processing schedule for said non-compressed image signal.

8. The image processing system of claim 7, further comprising:
- (k) means for storing said expansion processing schedule and said compression processing schedule;
- (l) timer means for counting time to generate a clock signal indicative of current time $t_{now}$;
- (m) means for reading said expansion processing schedule out of said means (k) in response to said clock signal and thereafter outputting said expansion processing schedule to said means (b); and
- (n) means for reading said compression processing schedule out of said means (k) in response to said clock signal and thereafter outputting said compression processing schedule to said means (b).

9. An image processing system for expanding compressed image signals to obtain expanded image signals which are to be subjected to image edition processing from predetermined first time points, respectively, said system comprising:
- (a) first memory means for storing said compressed image signals;
- (b) means for classifying said compressed image signals in to a plurality of signal groups each including at least one compressed image signal;
- (c) a plurality of means for expanding respective compressed image signals belonging to said plurality of groups in accordance with respective expansion processing schedules, respectively, to obtain said expanded image signals, wherein expansion of said compressed image signals are started from respective second time points;
- (d) second memory means for storing said expanded image signals; and
- (e) means for reading said expanded image signals out of said second memory means to output said expanded image signals to an image editor;

wherein said means (c) comprises:
- (c-1) means for inputting sets of signals, each set including:
- a first information signal designating one of said compressed image signals; and
- a second information signal representing one of said first time points corresponding said one of said compressed image signals;
- (c-2) means for calculating said second time points as a function of said sets of signals such that:
- respective time periods during which said expanded image signals are stored in said second memory means are minimized for each signal group under the condition that respective expansions of said compressed image signals are terminated before said first time points, respectively; and
- (c-3) means for determining said respective expansion processing schedules as a function of said second time points.

10. The image processing system of claim 9, wherein said means (b) comprises:
- (b-1) means for serially changing classification of said compressed image signals among possible all classification modes;

said means (c-2) comprises:
- (c-2-1) means for calculating expansion processing times required for expanding said compressed image signals for each signal group;
- (c-2-2) means for summing said expansion processing times for each signal group to obtain summation values for respective signal groups;
- (c-2-3) means for obtaining a maximum value of said summation values;
- (c-2-4) means for activating said means (c-2-1) and (c-2-2) every time said classification is changed by said means (b-1) to thereby obtain a plurality of maximum values;
- (c-2-5) means for obtaining a minimum value among said plurality of maximum values to determine an optimum classification of said compressed image signals; and
- (c-2-6) means for determining said respective expansion processing schedules an accordance with said optimum classification.

11. A method of expanding compressed image signals to obtain expanded image signals which are to be subjected to image edition processing from predetermined first time points, respectively, said method comprising the steps of:
- (a) storing said compressed image signals in first memory means;
- (b) expanding said compressed image signals in accordance with an expansion processing schedule to obtain said expanded image signals, wherein expansion of said compressed image signals are started from respective second time points;
- (c) storing said expanded image signals in second memory means; and
- (d) reading said expanded image signals out of said second memory means to output said expanded image signals to an image editor;

wherein said step (b) comprises the steps of:
- (b-1) inputting sets of signals, each set including:
- a first information signal designating one of said compressed image signals; and
- a second information signal representing one of said first time points corresponding said one of said compressed image signals;
- (b-2) calculating said second time points as a function of said sets of signals such that:
- respective time periods during which said expanded image signals are stored in said second memory means are minimized under the condition that respective expansions of said compressed image signals are terminated before said first time points, respectively; and
- (b-3) determining said expansion processing schedule as a function of said second time points.

12. The method of claim 11, wherein said step (b-2) comprises the steps of:
- (b-2-1) sorting said sets of signals according to said second time points included respective sets of signals to thereby obtain sorted sets of signals arranged in an ascent order of time values of said first time points;
- (b-2-2) calculating expansion time periods expected to be required for said respective expansions of said compressed image signals; and
- (b-2-3) serially calculating said second time points as a function of said sorted sets of signals and said expansion time periods in a descent order of time values of said first time points;

13. The method of claim 12, wherein said compressed image signals include m-th to M-th compressed image signals arranged in accordance with said descent order of time values of said first time points, where the numbers "m" and "M" are positive integers satisfying the relation $m < M$;

said first time points include m-th to M-th values $T_m - T_M$ corresponding to said m-th to M-th compressed image signals, respectively;

said second time points include m-th to M-th values $S_m - S_M$ corresponding to said m-th to M-th compressed image signals, respectively; and said step (b-2-3) comprises the step of;

(b-2-3-1) comparing an (i+1)-th value $S_{i+1}$ of said second time points with an i-th value $T_i$ of said first time points to thereby calculate an i-th value $S_i$ of said second time points, where the number "i" is a positive integer satisfying the relation m<i<M.

14. The method of claim 13, wherein said expansion time periods include a i-th value $C_i$ corresponding to an i-th compressed image signal; and said step (b-2-3-1) comprises the steps of:

(b-2-3-1-1) comparing said (i+1)-th value $S_{i+1}$ of said second time points with said i-th value $T_i$ of said first time points;

(b-2-3-1-2) generating a logical signal selectively having first and second logical levels, wherein said first logical level indicates that a first condition:

$$S_{i+1} > T_i$$

is satisfied, while said second logical level indicates that a second condition:

$$S_{i+1} \leq T_i$$

is satisfied;

(b-2-3-1-3) obtaining said i-th value $S_i$ of said second time points in response to said first logical level as a function of a difference $(T_i - C_i)$ between said i-th value $T_i$ of said first time points and said i-th value $C_i$ of said expansion time periods; and (b-2-3-1-4) obtaining said i-th value $S_i$ of said second time points in response to said first logical level as a function of a difference $(S_{i+1} - C_i)$ between said (i+1)-th value $S_{i+1}$ of said second time points and said i-th value $C_i$ of said expansion time periods.

15. The method of claim 14, wherein said compressed image signals include an (M+1)-th compressed image signal which is not subjected to said image edition;

said second time points include an (M+1)-th value $S_{M+1}$ corresponding to said (M+1)-th compressed image signal; and said step (b-2-3-1) further comprises the steps of:

(b-2-3-1-5) storing said (M+1)-th value $S_{M+1}$ of said second time points; and (b-2-3-1-6) comparing said (M+1)-th value $S_{M+1}$ of said second time points with said M-th value $T_M$ of said first time points.

16. The method of claim 15, further comprising the steps of:

(e) inputting a non-compressed image signal; and (f) compressing said non-compressed image signal in accordance with a compression processing schedule.

17. The method of claim 16, wherein said step (e) comprises the step of:

(e-1) storing said non-compressed image signal;

said method further comprising the steps of:

(g) inputting a third information signal designating said non-compressed image signal;

(h) calculating a compression processing time period $C_{com}$ required to compress said non-compressed image signal designated by said third information signal;

(i) reading said expansion processing schedule to determine an idle time period during which said expansion of said compressed image signals is not executed; and (j) comparing said idle time with said compression processing time period $C_{com}$ to determine said compression processing schedule for said non-compressed image signal.

18. The method of claim 17, further comprising the steps of:

(k) storing said expansion processing schedule and said compression processing schedule in third memory means;

(l) counting time to generate a clock signal indicative of current time $t_{now}$;

(m) reading said expansion processing schedule out of said third memory means in response to said clock signal and thereafter outputting said expansion processing schedule for said step (b); and (n) reading said compression processing schedule out of said third memory means in response to said clock signal and thereafter outputting said compression processing schedule for said step (b).

19. A method of expanding compressed image signals to obtain expanded image signals which are to be subjected to image edition processing from predetermined first time points, respectively, said method comprising the steps of:

(a) storing said compressed image signals in first memory means;

(b) classifying said compressed image signals in to a plurality of signal groups each including at least one compressed image signal;

(c) expanding respective compressed image signals belonging to said plurality of groups in a plurality of expansion means in accordance with respective expansion processing schedules, respectively, to obtain said expanded image signals, wherein expansion of said compressed image signals are started from respective second time points;

(d) storing said expanded image signals in second memory means; and (e) reading said expanded image signals out of said second memory means to output said expanded image signals to an image editor;

wherein said step (c) comprises the steps of:

(c-1) inputting sets of signals, each set including:

a first information signal designating one of said compressed image signals; and a second information signal representing one of said first time points corresponding said one of said compressed image signals;

(c-2) calculating said second time points as a function of said sets of signals such that:

respective time periods during which said expanded image signals are stored in said second memory means are minimized for each signal group under the condition that respective expansions of said compressed image signals are terminated before said first time points, respectively; and (c-3) determining said respective expansion processing schedules as a function of said second time points.

20. The image processing method of claim 19, wherein said step (b) comprises the step of:
- (b-1) serially changing classification of said compressed image signals among possible all classification modes;

said step (c-2) comprises the steps of:
- (c-2-1) calculating expansion processing times required for expanding said compressed image signals for each signal group;
- (c-2-2) summing said expansion processing times for each signal group to obtain summation values for respective signal groups;
- (c-2-3) obtaining a maximum value of said summation values;
- (c-2-4) repeating said steps (c-2-1) and (c-2-2) every time said classification is changed in said step (b-1) to thereby obtain a plurality of maximum values;
- (c-2-5) obtaining a minimum value among said plurality of maximum values to determine an optimum classification of said compressed image signals; and
- (c-2-6) determining said respective expansion processing schedules an accordance with said optimum classification.

* * * * *